Patented Dec. 4, 1934

1,983,367

UNITED STATES PATENT OFFICE 1,983,367

INSULATION MATERIAL

Richards H. Harrington, Schenectady, N. Y., assignor to General Electric Company, a corporation of New York No Drawing. Application March 30, 1933, Serial No. 663,553

3 Claims. (Cl. 106—13)

The present invention relates to insulation materials and is specifically directed to film insulation which is applied to objects requiring electrical insulation.

In electrical apparatus such as dynamo electric machines, transformers and the like various insulation materials are employed to insulate the metallic laminations. It has been desired to employ film insulation in electrical apparatus embodying metallic laminations in order to decrease the insulation space factor and to produce more compact structures. An insulation material which could be applied in film form, as a coating composition for example, and which in final form was hard and flexible, and resistant to heat, moisture, mineral oils and abrasion hence has been sought.

Geer Patent 1,744,881 discloses a paint consisting principally of an artificial rubber isomer dispersed and stabilized in a suitable vehicle. This material of itself is not suitable as an insulation material. For example, it is readily softened and finally dissolved by transil oil such as is employed in transformers. Moreover, this material ages rapidly, becomes hard and brittle and fails on standard bending tests.

I have discovered that if I modify the coating composition in the Geer patent above referred to by including therein a specific oxide I obtain a composition which is an excellent electrical insulator against low voltages, is capable of withstanding heat up to temperature of about 200° C. and is tough, flexible, abrasion and moisture resistant. The specific oxide which gives these unexpected results is chromium oxide, $Cr_2O_3$.

In order to prepare the insulation material of my invention I take, for example, a suitable quantity of a composition of the character described in the Geer patent heretofore mentioned and which has approximately the following composition:

| | Percent |
|---|---|
| Artificial rubber isomer | 89 |
| Manganese linoleate (drier) | 1 |
| Drying oil | 10 |

To the above composition I add about 10 to 20% by weight of turpentine and with this mixture I compound a quantity of chromium oxide, say 50 to 60% by weight of the final mass. The final mass is applied to the object to be insulated either by brushing, spraying, dipping or the like and the object is then baked at about 125 to 150° C. for about 15 minutes to 4 hours depending on the thickness of the coating applied and the characteristics desired in the final film. For example, a short bake at the lower temperature limit gives a tough coating but not as hard as one formed by a longer bake at the higher temperature limit.

Motors in which the commutator segments have been provided with the film insulation of my invention, in place of the usual mica have been run on test for approximately two years with excellent results. The insulation successfully withstands the action of molten tin for a relatively long period of time. This, coupled with its ease of application to commutator segments makes it an excellent insulation material for this purpose.

The insulation material of my invention shows no apparent signs of harmful aging effects after aging tests lasting many months. It is unattacked for a long period by mineral oil, such as transil oil, both at room temperatures and elevated temperatures, such as 100° C.

Due to its composition and insulating characteristics it has been useful as an adhesive to bond the laminations in graphite brushes used in motors.

What I claim as new and desire to secure by Letters Patent of the United States, is:—

1. An insulation material comprising chromium oxide ($Cr_2O_3$), an artificial rubber isomer and turpentine.

2. A surface provided with an insulation film comprising an artificial rubber isomer and chromium oxide ($Cr_2O_3$), said film being in a tough, flexible state, and resistant to abrasion, heat and moisture.

3. An electrically insulating material comprising an artificial rubber isomer, chromium oxide ($Cr_2O_3$), drying oil and drier.

RICHARDS H. HARRINGTON.